L. F. PARKHURST & H. G. WEEKS.
ELECTRIC PERCOLATOR.
APPLICATION FILED SEPT. 27, 1909.
968,682.
Patented Aug. 30, 1910.
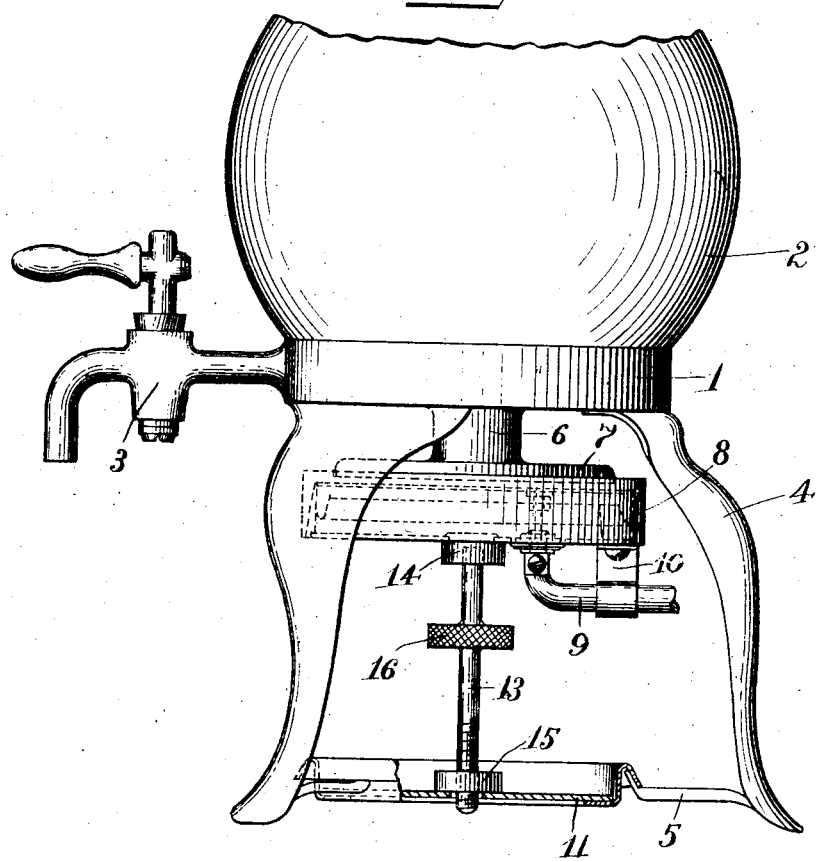
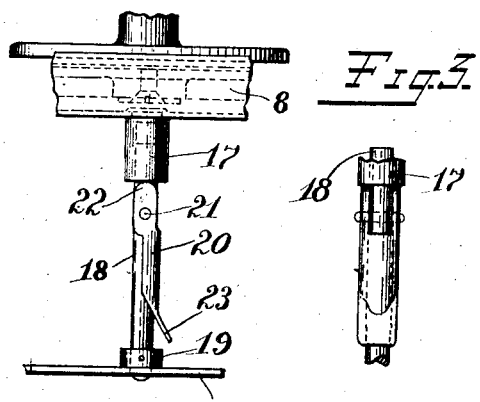
Witnesses:
Fred M. Dannenfelser.
Chas. W. ___
L. F. Parkhurst. Inventors
H. G. Weeks.
By their Attorneys.

UNITED STATES PATENT OFFICE.

LEON F. PARKHURST AND HARRY G. WEEKS, OF BINGHAMTON, NEW YORK, ASSIGNORS TO DIAMOND ELECTRIC COMPANY, OF BINGHAMTON, NEW YORK, A CORPORATION OF NEW YORK.

ELECTRIC PERCOLATOR.

968,682.  Specification of Letters Patent.  Patented Aug. 30, 1910.

Application filed September 27, 1909. Serial No. 519,812.

*To all whom it may concern:*

Be it known that we, LEON F. PARKHURST and HARRY G. WEEKS, citizens of the United States, residing at Binghamton, county of Broome, State of New York, have invented certain new and useful Improvements in Electric Percolators, of which the following is a full, clear, and exact description.

Our invention relates to electric heating devices and is particularly concerned with a construction of such devices adapted for heating percolator pots and the like.

The object of the invention is to provide a construction of this description which may be used with the ordinary form of combined percolator pot and stand and may be supported upon the usual lamp support and adjusted to fit closely against the bottom of the percolating chamber notwithstanding variations in the distances between the lamp support and the bottom of the pot in different makes of percolators.

With these objects in view the invention consists in the construction and arrangement of parts preferred embodiments of which are illustrated in the accompanying drawings, in which—

Figure 1 is a side elevation of a portion of a percolating pot and stand, showing the improved heater fitted thereto. Fig. 2 is a view of a modified form of the adjusting mechanism for said heater, and Fig. 3 is a fragmentary view of parts shown in Fig. 2.

The embodiment of our invention illustrated in Fig. 1 comprises a stand having a supporting ring 1, to which the percolator pot 2 is secured, said pot having the usual tap 3. The ring 1 is supported by the legs 4 to the lower ends of which is secured the usual lamp support 5. In the form here illustrated the pot is provided with a disk percolating chamber 6 of well known construction having at its base the extended disk 7 to increase the heating surface.

It is essential to the successful use of electric heaters to heat liquid in the containing vessels that the heater be brought into and maintained in intimate contact with the base of said vessels. With this end in view, our invention consists of the heater 8 which may be of any desired internal construction and is provided with a flat top to fit snugly against the base of the heating chamber 6 or of the vessel to be heated. The heater is provided with the usual leading in cables 9 which may be conveniently supported upon the heater by bracket 10.

In order to support the heater from the usual lamp support, we provide in conjunction therewith a disk like base 11 which fits within the lamp receiving rim of the lamp support which holds the base securely in position and centers the heater with respect to the vessel to be heated.

In order to adapt the heater to percolators or other like utensils to be heated, the base 11 is connected with the heater proper by means of a rotatable stem 13 swiveled at its upper end within a head 14 secured to the base of the heater and threaded at its lower end to engage a threaded nut 15 secured to the base 11. For convenience of manipulation the stem 13 may be provided with a knurled finger piece 16. In order to mount the heater within the utensil here illustrated, the base 11 is sufficiently adjusted toward the heater 8 to permit these parts to be inserted between the bottom of the heating chamber 6 and the lamp support 5. The base 11 is then slipped within the rim of the lamp support and the stem 13 adjusted until the heater is brought firmly and snugly in contact with the base of the heating chamber 6. This adjustment of the part serves not only to bring the heater in such intimate contact but also serves to hold the heater as a whole securely clamped in proper position.

While we have herein described the base as in the form of a disk provided with a means for engaging the lamp support, it is obvious that this construction may be modified in numerous ways by constructing the base in the form of a spider within the scope of our invention.

In the modified form of our invention illustrated in Figs. 2 and 3, the same comprises the heating member proper 8, which as above stated, may be of any desired construction, and a disk like base 11 which may be similar to that above described, the adjusting mechanism in this modification, however, comprising a tubular member 17, secured to the under side of the heater proper, into which fits a stem 18 which is secured at its lower end to the base 11 in a socket 19. Upon the stem 18 a cam lever 20 is pivoted at 21 having the cam end 22 arranged to engage the lower end of the tubular member 17. The opposite end of the cam lever is provided with a finger piece 23 for convenient manipulation. In fitting this device to the utensil to be heated as, for example, the percolator illustrated in Fig. 1, the cam lever 20 is turned upwardly and away from the stem 18, thus permitting the heater and base to approach each other, whereby the heater may be readily slipped in between the lamp support and the bottom of the vessel to be heated and seated within the lamp support. The lever is then swung to a position parallel to the stem 18, as shown in Fig. 2, whereupon the cam end 22 of said lever will engage the lower end of the tubular member 17 and elevate the heater into close contact with the bottom of the vessel to be heated.

While this modified form of adjusting mechanism will operate most effectively when the cam lever 20 lies parallel and in contact with the stem 18, it is obvious that it will still hold the parts properly in position even though the distance between the lamp support and the bottom of the vessel is not sufficient to permit swinging of the lever fully into its position parallel with said stem, whereby this adjusting mechanism also is adapted for use with utensils of various makes or sizes and differing with respect to the distance between the lamp support and the bottom of the vessel to be heated.

While we have herein described preferred forms of our invention, it is to be understood that the same may be varied in detail and relative arrangement of parts without departing from the spirit or scope thereof.

What we claim is:

1. In an electric heating device, a heating member proper, a disk like base, a stem swiveled to one of said parts and having screw engagement with the other of said parts, whereby the distance between said parts may be varied.

2. In an electric heating device, a heating member proper, a disk like base, a stem swiveled to said heating member at one end and screw threaded at the opposite end and a nut on said base to receive said screw threaded end whereby said heating member and said base may be adjusted relatively to each other.

3. In a device of the character described, a liquid container, a stand therefor, a lamp support attached to said stand, an electric heating device comprising a heating member proper, a base adapted to be supported from said lamp support, an adjustable means between said heating member and said base whereby said heating member may be brought into intimate contact with the bottom of said liquid container.

4. In an apparatus of the character described, a liquid container, a stand therefor, a lamp support secured to said stand, an electric heating device comprising a heating member proper, a base adapted to fit within and be supported by said lamp support, a stem swiveled to one member of said heating device and adjustably connected to the other member thereof, whereby said heating member may be adjusted into intimate contact with the bottom of said container.

LEON F. PARKHURST.
HARRY G. WEEKS.

Witnesses:
ISRAEL T. DEYO,
INA E. HILLER.